US009495611B2

(12) United States Patent
Sumitomo

(10) Patent No.: US 9,495,611 B2
(45) Date of Patent: Nov. 15, 2016

(54) IMAGE PROCESSING APPARATUS, IMAGE PROCESSING METHOD, AND IMAGE PROCESSING PROGRAM

(71) Applicant: KONICA MINOLTA, INC., Tokyo (JP)

(72) Inventor: Hironori Sumitomo, Moriguchi (JP)

(73) Assignee: KONICA MINOLTA, INC., Tokyo (JP)

( * ) Notice: Subject to any disclaimer, the term of this patent is extended or adjusted under 35 U.S.C. 154(b) by 32 days.

(21) Appl. No.: 14/372,422

(22) PCT Filed: Dec. 26, 2012

(86) PCT No.: PCT/JP2012/083562
§ 371 (c)(1),
(2) Date: Jul. 15, 2014

(87) PCT Pub. No.: WO2013/108554
PCT Pub. Date: Jul. 25, 2013

(65) Prior Publication Data
US 2015/0010240 A1 Jan. 8, 2015

(30) Foreign Application Priority Data
Jan. 17, 2012 (JP) .................................. 2012-007319

(51) Int. Cl.
*G06K 9/00* (2006.01)
*G06K 9/62* (2006.01)
(Continued)

(52) U.S. Cl.
CPC ........... *G06K 9/6202* (2013.01); *G06K 9/4642* (2013.01); *G06K 9/522* (2013.01);
(Continued)

(58) Field of Classification Search
CPC ............ G06T 2207/20056; G06K 2009/6213; G06K 9/0053; G06K 9/4642
USPC ........................................................ 382/205
See application file for complete search history.

(56) References Cited

U.S. PATENT DOCUMENTS 4,903,142 A * 2/1990 Hasebe .............. H04N 1/40075
358/3.08
6,148,270 A 11/2000 Nakajima et al.
(Continued)

FOREIGN PATENT DOCUMENTS

JP 04-007681 A 1/1992
JP 07-021387 A 1/1995
(Continued)

OTHER PUBLICATIONS

International Search Report in International Application No. PCT/JP2012/083562 dated Apr. 2, 2013, 2 pages.
(Continued)

*Primary Examiner* — Stephen R Koziol
*Assistant Examiner* — Shaghayegh Azima
(74) *Attorney, Agent, or Firm* — Brinks Gilson & Lione

(57) ABSTRACT

An image processing apparatus for searching for corresponding points between a first image and a second image is provided. The image processing apparatus includes a window setting portion, a phase information extraction portion that extracts phase information by subjecting a representation included in each set window to frequency decomposition, a corresponding points determination portion that determines the corresponding points based on comparison of the phase information extracted from each window, and a window size control portion that causes the window setting portion to set a window different in size in accordance with a frequency used for calculation of the frequency decomposition. The window size control portion causes the window setting portion to set a window having a first size in response to a first frequency and to set a window having a second size smaller than the first size in response to a second frequency higher than the first frequency.

6 Claims, 16 Drawing Sheets

(51) Int. Cl.
  *G06T 7/00* (2006.01)
  *G06K 9/46* (2006.01)
  *G06K 9/52* (2006.01)
(52) U.S. Cl.
  CPC .......... *G06K 9/6203* (2013.01); *G06K 9/6211* (2013.01); *G06T 7/0022* (2013.01); *G06K 2009/6213* (2013.01); *G06T 2207/10012* (2013.01); *G06T 2207/20016* (2013.01); *G06T 2207/20021* (2013.01); *G06T 2207/20056* (2013.01)

(56) References Cited

U.S. PATENT DOCUMENTS

| | | | | |
|---|---|---|---|---|
| 6,167,151 | A * | 12/2000 | Albeck | G06K 9/00201 345/419 |
| 6,201,541 | B1 | 3/2001 | Shalom et al. | |
| 9,042,655 | B2 * | 5/2015 | Sumitomo | G06T 7/0042 348/207.1 |
| 2001/0016063 | A1 | 8/2001 | Albeck et al. | |
| 2006/0247898 | A1 * | 11/2006 | Cha | H04L 27/2623 702/188 |
| 2007/0217517 | A1 * | 9/2007 | Heyward | H04N 5/145 375/240.21 |
| 2012/0293633 | A1 * | 11/2012 | Yamato | G01C 11/06 348/47 |

FOREIGN PATENT DOCUMENTS

| | | | |
|---|---|---|---|
| JP | 10-134196 | | 5/1998 |
| JP | 2008-145431 A | | 6/2008 |
| JP | 2011-170519 | * | 9/2011 |
| JP | 2011-170519 A | | 9/2011 |

OTHER PUBLICATIONS

Takita, Kenji, Muquit, Mohammad Abdul, Aoki, Takafumi, and Higuchi, Tatsuo, "A Sub-Pixel Correspondence Search Technique for Computer Vision Applications,"IEICE Trans. Fundamentals, vol. E87-A, No. 8, Aug. 2004, pp. 1913-1923.
Uemura, Atsushi, Ito, Izumi, and Kiya, Hitoshi, "Subpixel Image Matching Using DCT Sign Correlation," IEICE Technical Report, ITS2007-76, 1E2007-259(Feb. 2008), pp. 77-82, in Japanese, with English language Abstract.
Office Action mailed on Jan. 29, 2016 regarding corresponding Chinese patent application 201280067334.X (7 pages); including English-language translation of Office Action (9 pages).
Office Action mailed on Aug. 2, 2016 regarding corresponding Japanese patent application 2013-554220, three pages, including English-language translation of Office Action, 4 pages.

* cited by examiner

IMAGE PROCESSING APPARATUS, IMAGE PROCESSING METHOD, AND IMAGE PROCESSING PROGRAM

This application is a National Stage application of International Application No. PCT/JP2012/083562, filed Dec. 26, 2012.

TECHNICAL FIELD

The present invention relates to an image processing apparatus, an image processing method, and an image processing program for searching for corresponding points between images.

BACKGROUND

Various techniques for searching for corresponding points between images, such as at which position on each image a certain portion of an object is present in a plurality of images obtained by image pick-up of the same object with a plurality of image pick-up apparatuses, have conventionally been proposed. Such techniques involved with corresponding points search are typically made use of for realization of stereoscopic display with the use of stereo images.

In such processing for search for corresponding points between images, various methods are adopted. By way of example, phase-only correlation (hereinafter also referred to as "POC") has been well known. In this POC, corresponding points between images are searched for by using information on a phase difference between spatial frequencies included in images. A technique as below has been known as a prior technique involved with such corresponding points search.

For example, Japanese Laid-Open Patent Publication No. 10-134196 (PTD 1) discloses a distance measurement apparatus for measuring, by setting a car or a person as an object (a target) and collating image data based on spatial frequency characteristics, a distance to the target, from results of collation. More specifically, in Japanese Laid-Open Patent Publication No. 10-134196 (PTD 1), data of an image picked up by a first camera is defined as registered image data, which is subjected to two-dimensional discrete Fourier transform (DFT) to obtain registered Fourier image data, and data of an image picked up by a second camera is defined as collation image data, which is subjected to DFT to obtain collation Fourier image data. The registered Fourier image data and the collation Fourier image data are synthesized and the synthesized data is subjected to amplitude suppression processing and then to DFT. A distance to the target is measured based on a distance from a center of a correlation component area to a correlation peak in this synthesized Fourier image data subjected to DFT.

CITATION LIST

Patent Document

PTD 1: Japanese Laid-Open Patent Publication No. 10-134196

SUMMARY OF INVENTION

Technical Problem

Phase-only correlation (POC) is advantageous in robustness and accuracy higher than a method of using information on the sum of absolute difference (SAD) in luminance. On the other hand, since it requires processing high in operation load such as frequency decomposition, a time period for operation in overall processing is disadvantageously very long.

In the method disclosed in Japanese Laid-Open Patent Publication No. 10-134196 (PTD 1) described above as well, entire registered image data and collation image data are subjected to two-dimensional discrete Fourier transform, and operation load is high.

The present invention was made to solve such problems, and an object thereof is to provide an image processing apparatus, an image processing method, and an image processing program, capable of reducing a time period for operation in entire processing involved with processing for search for corresponding points between images.

Solution to Problem

According to one aspect of the present invention, an image processing apparatus for searching for corresponding points between a first image and a second image is provided. The image processing apparatus includes window setting means for setting a window for each of the first image and the second image, phase information extraction means for extracting phase information by subjecting an image included in each set window to frequency decomposition, corresponding points determination means for determining corresponding points between the first image and the second image based on comparison of the phase information extracted from each window, and window size control means for causing the window setting means to set a window different in size in accordance with a frequency used for calculation of the frequency decomposition. The window size control means causes the window setting means to set a window of a first size in response to a first frequency and to set a window of a second size smaller than the first size in response to a second frequency higher than the first frequency.

Advantageous Effects of Invention

According to the present invention, a time period for operation in entire processing involved with processing for search for corresponding points between images can be decreased.

DETAILED DESCRIPTION OF THE DRAWINGS AND THE PRESENTLY PREFERRED EMBODIMENTS

Figure 1:
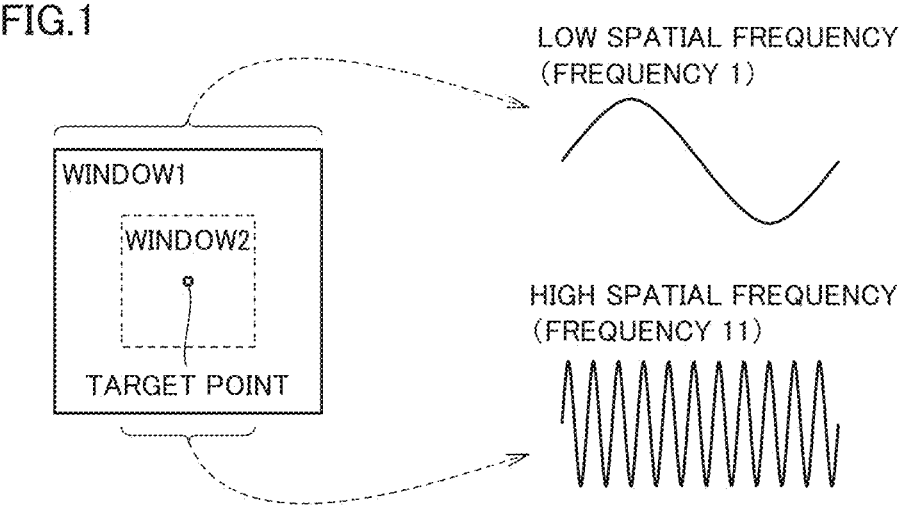
FIG. 1 is a diagram for illustrating outlines of a method for searching for corresponding points according to an embodiment of the present invention.

An embodiment of the present invention will be described in detail with reference to the drawings. It is noted that the same or corresponding elements in the drawings have the same reference characters allotted and description thereof will not be repeated.

[A. Outlines]

The embodiment of the present invention is directed to a corresponding points search method for searching for corresponding points at least between a first image and a second image. Namely, a plurality of images which are searched for corresponding points mean images which may commonly include an image of (at least a part of) the same object, and they may be three or more images. Such a plurality of images are typically obtained by using a plurality of image pick-up apparatuses (cameras) to pick up images of the same object from different points of view. More specifically, images are obtained by image pick-up of the same object with the use of a plurality of cameras (typically, stereo cameras) arranged at a prescribed distance.

In the description below, for the sake of convenience of illustration, a target pixel (a target point) is set in the first image, and a point on the second image corresponding to the set target point is searched for. In such corresponding points search processing, the first image is referred to as a "base image" and the second image is referred to as a "reference image". In a case that corresponding points among three or more images are searched for, any one image is set as the "base image" and an image pick-up apparatus (a camera) for image pick-up is set as a camera for image pick-up of the "base image". Other images are all set as the "reference images" and image pick-up apparatuses (cameras) for image pick-up are set as cameras for image pick-up of the "reference images". With such an expansion method, the corresponding points search method according to the present embodiment can be applied also to search for corresponding points among three or more images.

The corresponding points search method according to the present embodiment is typically directed to processing for search for corresponding points between images of which stereo images have been picked up and generation of a stereoscopic image, however, the method is not limited thereto but is applicable also to processing for generating a panoramic image.

Correspondence obtained with the corresponding points search method according to the present embodiment is hereinafter denoted as "a result of search for corresponding points." This result of search for corresponding points typically includes a position of each pixel on a base image (a coordinate position of each target point) and a position of a pixel on a reference image corresponding to a position of each pixel.

Figure 2:
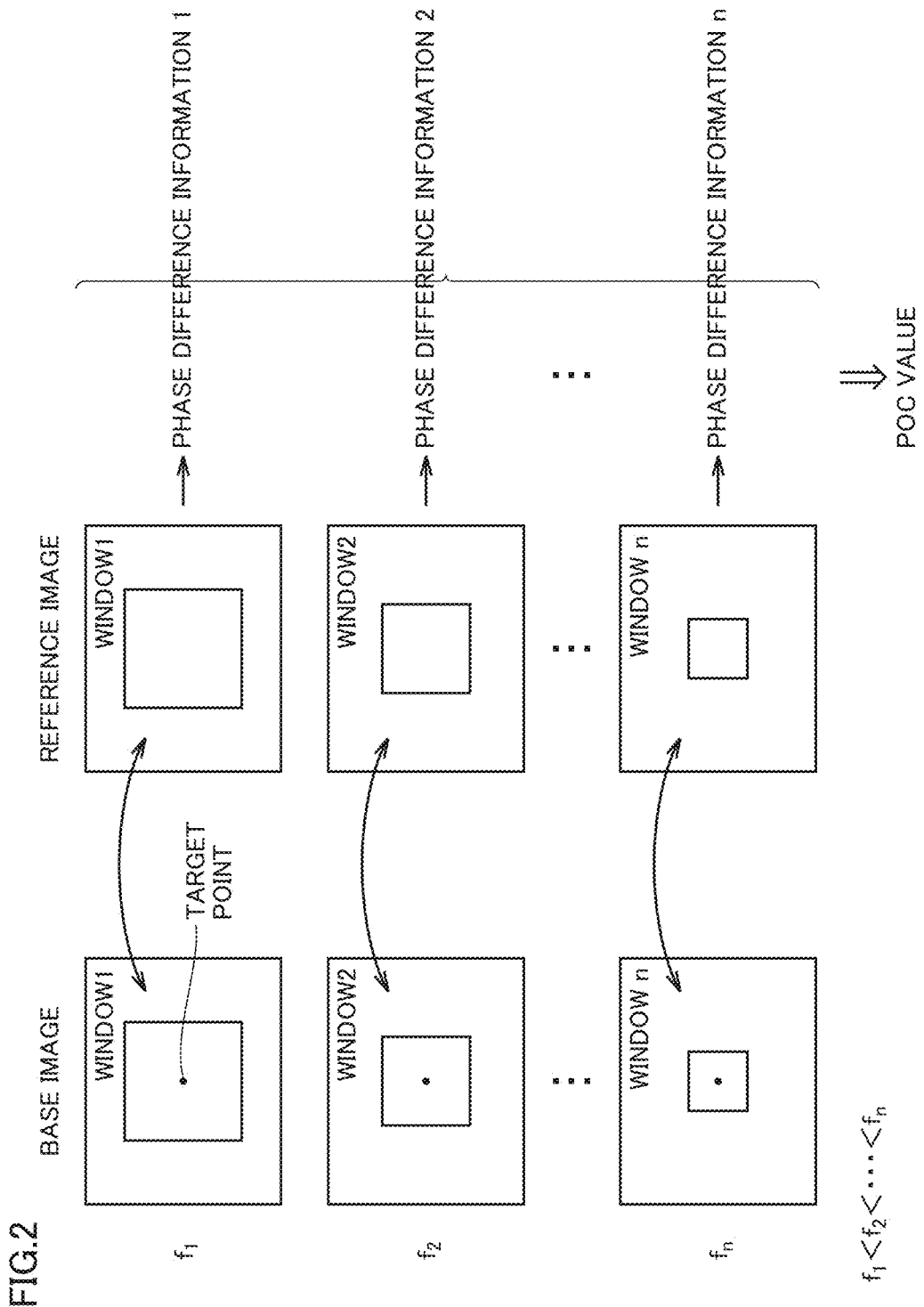
FIG. 2 is a diagram for illustrating the outlines of the method for searching for corresponding points according to the embodiment of the present invention.

FIGS. 1 and 2 are diagrams for illustrating outlines of a corresponding points search method according to the embodiment of the present invention.

The corresponding points search method according to the present embodiment searches for corresponding points between images by using difference in phase information (hereinafter also referred to as "phase difference information") between a base image and a reference image. The phase information and the phase difference information are calculated for each frequency (spatial frequency) per each window set for the base image and the reference image. Namely, phase information over a prescribed frequency range is calculated.

Here, a wavelength is different for each spatial frequency. Therefore, when a window (a region) of the same size is set, a wave number contained therein is varied depending on magnitude of a spatial frequency. Namely, when a spatial frequency is lower as shown in FIG. 1, information for one period cannot be obtained unless a window having a greater size is set. When a spatial frequency is higher, even with a window of a smaller size, information over sufficient periods can be obtained.

In the present embodiment, a window is set for each of the base image and the reference image and a representation included in each set window is subjected to frequency decomposition, to thereby extract phase information. Based on comparison of the phase information extracted from each window, corresponding points between the base image and the reference image are determined. Here, a window having a size in accordance with a frequency used for calculation of corresponding frequency decomposition is set.

Namely, as shown in FIG. 2, windows 1, 2, . . . , and n of a corresponding size are set for frequencies f1, f2, . . . , and fn (f1<f2< . . . <fn) used for frequency decomposition, respectively, and phase difference information is calculated between a pair of set windows. Namely, information on an image in a window of a corresponding size is obtained as phase difference information 1, 2, . . . , and n for frequencies f1, f2, . . . , and fn. Then, these pieces of phase difference information 1, 2, . . . , and n are summed to obtain information on frequency-phase difference, and in addition, a POC value which is an evaluation value in phase-only correlation (hereinafter also referred to as "POC") is calculated. Finally, a POC value is calculated separately for each target in the reference image, and a target point at which a POC value is maximal is searched for.

As described above, as a spatial frequency is higher, more wave numbers can be extracted within a window. Therefore, as compared with a case that a spatial frequency is lower, a size of a window set at the time when a spatial frequency is higher is set to be equal to or smaller than a size at the time when the spatial frequency is lower. In other words, a window of a first size is set in response to a first frequency, and a window of a second size equal to or smaller than the first size is set in response to a second frequency higher than the first frequency.

In consideration also of calculation cost for setting a window, as shown in FIG. 2, such setting that a size is differed for different spatial frequencies can also be made, however, a window of the same size may be brought in correspondence with a plurality of spatial frequencies.

Thus, in the corresponding points search processing according to the present embodiment, instead of fixing a size of a window used for frequency decomposition, windows different in size in accordance with a frequency used for frequency decomposition are set, to thereby decrease a time period for operation.

Further detailed contents of the corresponding points search processing will be described below.

[B. System Configuration]

A mount example of an image processing apparatus implementing the corresponding points search processing according to the embodiment of the present invention will initially be described.

<<b1: Implementation with Personal Computer>>

Figure 3:
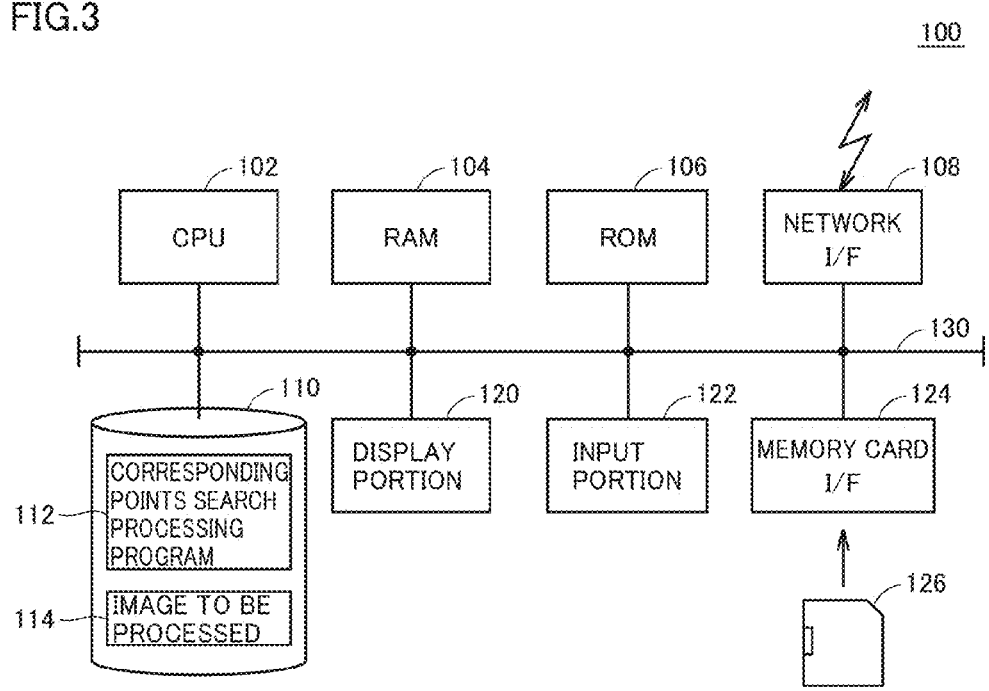
FIG. 3 is a block diagram showing a configuration in a case that corresponding points search processing according to the embodiment of the present invention is implemented with a personal computer.

FIG. 3 is a block diagram showing a configuration in a case that corresponding points search processing according to the embodiment of the present invention is implemented with a personal computer.

Referring to FIG. 3, an image processing apparatus 100 implemented by a personal computer is mainly mounted on a computer having a general-purpose architecture. Referring to FIG. 3, image processing apparatus 100 includes, as main components, a CPU (Central Processing Unit) 102, a RAM (Random Access Memory) 104, a ROM (Read Only Memory) 106, a network interface (I/F) 108, an auxiliary storage device 110, a display portion 120, an input portion 122, and a memory card interface (I/F) 124. The components are connected through a bus 130 so as to be able to communicate with one another.

CPU 102 controls image processing apparatus 100 as a whole by executing an operating system (OS) or various programs such as an image processing program stored in ROM 106 or auxiliary storage device 110. RAM 104 functions as a working memory for CPU 102 to execute a program, and primarily stores various types of data necessary for execution of a program. ROM 106 stores an initial program (a boot program) executed at the time of boot in image processing apparatus 100.

Network interface 108 exchanges data with other apparatuses (server apparatuses) through various communication media. More specifically, network interface 108 communicates data through wired circuits such as Ethernet® (LAN (Local Area Network) or WAN (Wide Area Network)) and/or wireless circuits such as wireless LAN.

Auxiliary storage device 110 is typically implemented by a large-capacity magnetic storage medium such as a hard disk, and stores an image processing program (a corresponding points search processing program 112) for implementing various types of processing according to the present embodiment and an image to be processed 114 of an object to be processed. Furthermore, auxiliary storage device 110 may store a program such as an operating system.

Image to be processed 114 includes at least two images of an object to be processed. A main body of image processing apparatus 100 does not have to have a function for image pick-up of an object. In this case, a mechanism similar to a digital camera as will be described later may be used to obtain at least two images, and then those images may be input to image processing apparatus 100 with any method. More specifically, images are input to image processing apparatus 100 through network interface 108 described above or memory card interface 124.

Display portion 120 displays a GUI (Graphical User Interface) picture provided by an operating system or an image generated as a result of execution of corresponding points search processing program 112. Preferably, display portion 120 stereoscopically displays an object by using a stereoscopic image generated from a result of search for corresponding points obtained as a result of execution of corresponding points search processing program 112. In this case, display portion 120 is implemented by any display device adapted to a three-dimensional display scheme. A parallax barrier scheme can be adopted as such a three-dimensional display scheme. In this parallax barrier scheme, a parallax barrier is provided on a liquid crystal display surface, so as to have a user's right eye visually recognize an image for right eye and have a user's left eye visually recognize an image for left eye. Alternatively, a shutter glass scheme may be adopted. In this shutter glass scheme, stereoscopic display can be enjoyed by displaying an image for left eye and an image for right eye as alternately switched at a high speed and having a user wear dedicated glasses incorporating shutters which are opened and closed in synchronization with switching between images.

Input portion 122 is typically implemented by a keyboard, a mouse, or a touch panel, and outputs contents of an instruction accepted from a user to CPU 102.

Memory card interface 124 reads and write data from and to various memory cards (non-volatile storage media) 126 such as an SD (Secure Digital) card or a CF (Compact-Flash®) card. Typically, memory card 126 storing images to be processed which were obtained with some apparatus is attached to memory card interface 124, and the images to be processed which were read from that memory card 126 are stored (copied) in auxiliary storage device 110.

Corresponding points search processing program 112 stored in auxiliary storage device 110 is distributed as being stored in such a storage medium as a CD-ROM (Compact Disk-Read Only Memory) or distributed from a server apparatus through a network. Corresponding points search processing program 112 may implement processing by invoking at prescribed timing and in a prescribed order, necessary modules among program modules provided as a part of an operating system executed in image processing apparatus 100 (a personal computer). In this case, corresponding points search processing program 112 itself does not contain a module provided by an operating system but implements image processing in cooperation with the operating system. Corresponding points search processing program 112 is not a stand-alone program but may be provided as being incorporated in a part of some program. In such a case as well, corresponding points search processing program 112 itself does not contain a module as commonly made use of in such some program, but implements image processing in cooperation with such some program. Even corresponding points search processing program 112 not containing some modules does not depart from the spirit of image processing apparatus 100 according to the present embodiment.

Functions provided by corresponding points search processing program 112 may be implemented in part or in the entirety by dedicated hardware.

<<b2: Implementation with Feature Similar to Digital Camera>>

Figure 4:
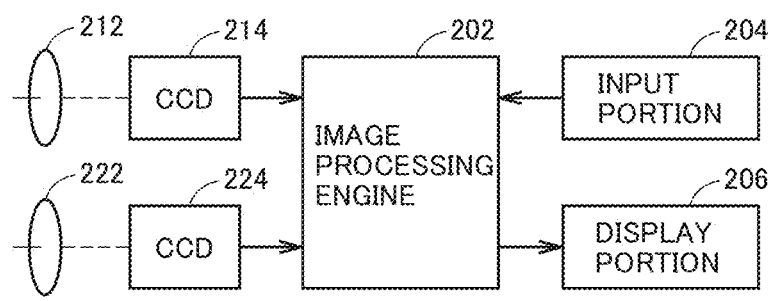
FIG. 4 is a block diagram showing a configuration in a case that corresponding points search processing according to the embodiment of the present invention is implemented with a feature similar to a digital camera.

FIG. 4 is a block diagram showing a configuration in a case that corresponding points search processing according to the embodiment of the present invention is implemented with a feature similar to a digital camera.

Referring to FIG. 4, an image processing apparatus 200 obtains at least two images to be processed by actual image pick-up of an object and subjects the obtained images to be processed to corresponding points search processing. Image processing apparatus 200 includes, as main components, an image processing engine 202, an input portion 204, a display portion 206, a pair of lenses 212, 222, and a pair of CCD (Charge Coupled Device) image sensors 214, 224.

Image processing engine 202 performs various types of digital processing including the corresponding points search processing according to the present embodiment. Image processing engine 202 is typically implemented by a DSP (Digital Signal Processor), an ASIC (Application Specific Integrated Circuit), an LSI (Large Scale Integration), or an FPGA (Field-Programmable Gate Array).

Input portion 204 is typically implemented by various key buttons or a touch panel, and outputs contents of an instruction accepted from a user to image processing engine 202.

Display portion 206 displays a user interface picture relating to image pick-up of an object. Preferably, display portion 206 stereoscopically displays an object by using a stereoscopic image generated from a result of search for corresponding points obtained by image processing engine 202. In this case, display portion 206 is implemented by any display device adapted to the three-dimensional display scheme, similarly to display portion 120 (FIG. 3) described above.

The pair of lenses 212, 222 is provided at different positions in a main body of image processing apparatus 200, and respective lenses can pick up images of an object at different points of view. Namely, different reflected light from the object is incident on the pair of lenses 212, 222. The pair of CCDs 214, 224 is brought in correspondence with the pair of lenses 212, 222, and receives light (image) from the object collected by lenses 212, 222 and outputs an electrical signal indicating the image to image processing engine 202.

<<b3: Implementation with Other Features>>

In addition to the implementation with the personal computer and the implementation with the feature similar to the digital camera described above, mount on a portable telephone is applicable. In addition, a form like what is called a cloud service form in which at least one server apparatus performs the processing according to the present embodiment may be applicable. In this case, such a configuration that a user uses his/her own terminal (such as a personal computer or a smartphone) to transmit at least two images to be processed to a server apparatus (on a cloud side) and the server apparatus subjects the transmitted images to be processed to image processing according to the present embodiment is assumed. Furthermore, the server apparatus does not have to perform all functions (processing) but a terminal on a user side and a server apparatus may cooperate with each other to perform image processing according to the present embodiment.

[C. Functional Configuration]

A functional configuration of the image processing apparatus and/or the image processing program according to the present embodiment will now be described.

Figure 5:
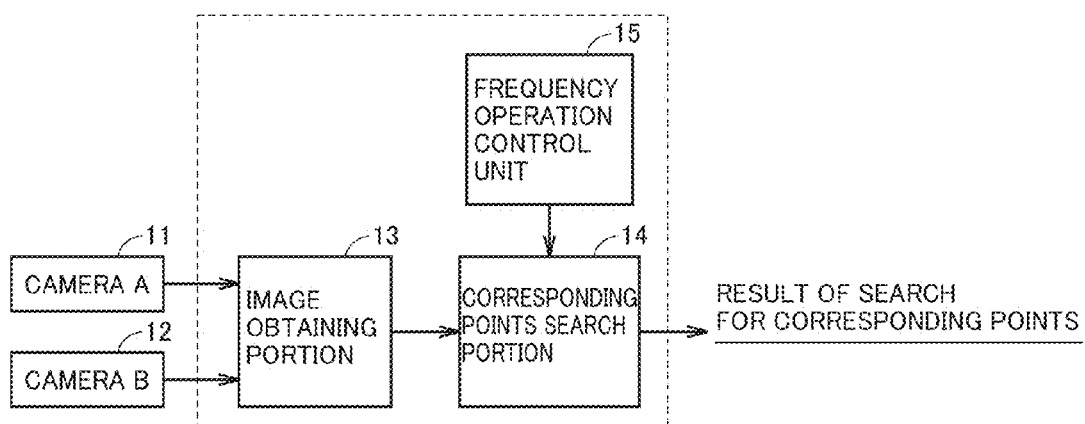
FIG. 5 is a block diagram showing a functional configuration of an image processing apparatus according to the embodiment of the present invention.
Figure 6:
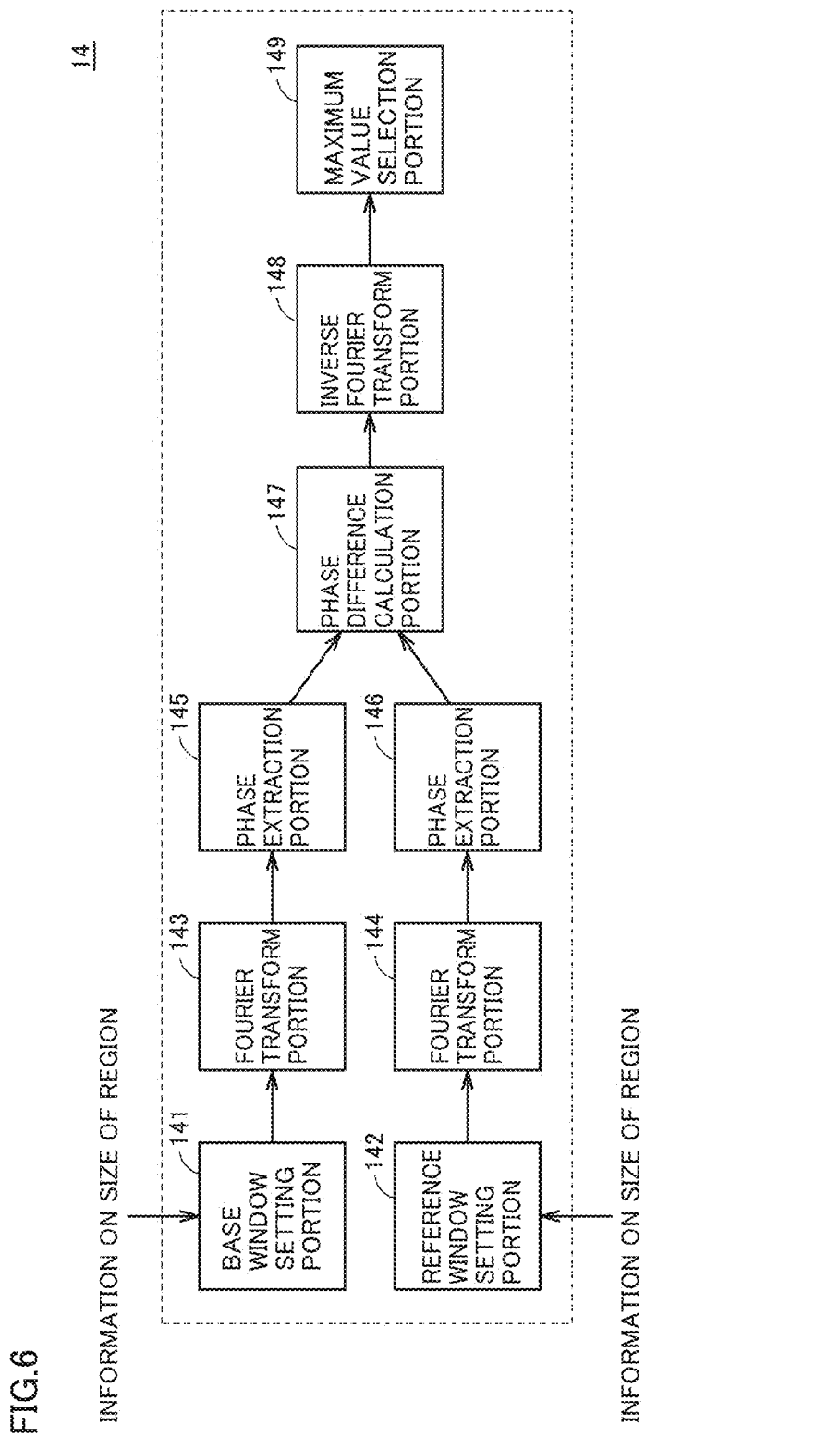
FIG. 6 is a block diagram showing a more detailed functional configuration of a corresponding points search portion shown in FIG. 5.

FIG. 5 is a block diagram showing a functional configuration of the image processing apparatus according to the embodiment of the present invention. FIG. 6 is a block diagram showing a more detailed functional configuration of a corresponding points search portion shown in FIG. 5.

Referring to FIG. 5, the image processing apparatus according to the present embodiment includes, as its main functional components, an image obtaining portion 13, a corresponding points search portion 14, and a frequency operation control unit 15. These functional components are implemented by execution of the corresponding points search processing program by CPU 102 in image processing apparatus 100 shown in FIG. 3, and implemented by image processing engine 202 in image processing apparatus 202 shown in FIG. 4.

<<c1: Image Obtaining Portion 13>>

Image obtaining portion 13 obtains an input image (a stereo image) generated as each of cameras 11 and 12 (a camera A and a camera B) picks up an image of an object. As described above, in a case that a pair of images is obtained, one image is referred to as a base image and the other image is referred to as a reference image. Image obtaining portion 13 is implemented as various interfaces for obtaining at least two images. Namely, it may directly accept input images from cameras 11 and 12 or accept input images through various recording media or networks. A plurality of input images obtained by image obtaining portion 13 are output to corresponding points search portion 14.

<<c2. Corresponding Points Search Portion 14>>

Corresponding points search portion 14 subjects two or more input images which were input to corresponding points search processing and outputs a result of search for corresponding points. Namely, corresponding points search portion 14 searches a reference image for corresponding points for each target point (target pixel) set on a base image.

In the present embodiment, corresponding points search portion 14 operates correlation between images based on similarity in phase information (a signal component in which an amplitude component has been suppressed) extracted by subjecting a pattern of a window (a search window) set for each input image (the base image and the reference image) to frequency decomposition. In an embodiment below, a configuration using phase-only correlation (POC) will be described as such a representative technique. The present invention, however, is not limited to use of POC, but is applicable to any method, so long as a method uses at least phase information. For example, a method described in Document 1 (Atsushi UEMURA, Izumi ITO, and Hitoshi KIYA, "Subpixel Image Matching Using DCT Sign Correlation," The Institute of Electronics, Information and Communication Engineers, IEICE Technical Report, IE, Image Engineering 107 (489), 77-82, 2008-02-12) is also applicable.

FIG. 6 shows a mount example of corresponding points search portion 14 in a case that the corresponding points search processing using phase-only correlation is performed. More specifically, corresponding points search portion 14 includes a base window setting portion 141, a reference window setting portion 142, Fourier transform portions 143 and 144, phase extraction portions 145 and 146, a phase difference calculation portion 147, an inverse Fourier transform portion 148, and a maximum value selection portion 149.

Base window setting portion 141 and reference window setting portion 142 set windows for the base image and the reference image, respectively. As will be described later, base window setting portion 141 and reference window setting portion 142 each determine a size of a window to be set, based on size information from frequency operation control unit 15.

For example, such corresponding points search processing as searching for a point S on a reference image corresponding to a certain point K on a base image is considered. In this case, initially, base window setting portion 141 sets a base window on the base image so as to include point K. Though a relative position of point K in the base window can arbitrarily be determined, here, the base window is set such that point K is located at a position of center of gravity thereof.

A window is set similarly also on the reference image. On a side of the reference image, however, a corresponding point is not known, and hence reference window setting portion 142 sets a reference window such that a predetermined candidate point S' is located at a position of center of gravity thereof. Regarding candidate point S', for example, in a case of an application in which parallax between stereo images is not great, a coordinate the same as that of point K should only be employed. In a case that a range of parallax between stereo images is wide, a coarse-to-fine strategy using multi-resolution which will be described later can be employed to allow use of a coordinate value the same as that of point K as an initial candidate point.

Fourier transform portion 143 converts image information to information on a frequency space by subjecting the base window set on the base image to Fourier transform. Similarly, Fourier transform portion 144 converts image information to information on a frequency space by subjecting the reference window set on the reference image to Fourier transform. This converted information on a frequency space includes amplitude information and phase information for each frequency. Namely, Fourier transform portions 143 and 144 subject partial images included in respective windows to frequency decomposition.

Initially, for understanding of Fourier transform portions 143 and 144 in the present embodiment, general Fourier transform will be explained.

For example, in a case of a window size N×M, the entire range of frequencies in a lateral direction is expressed with a direct-current component and alternating-current components of frequencies F1 to Fx_max=(N−1)/2 (where N is a size indicated by an odd number) and the entire range of frequencies in a vertical direction is expressed with a direct-current component and frequencies F1 to Fy_max=(M−1)/2 (where M is a size indicated by an odd number). In effect, though N or M alternating-current components are present, they have information symmetric with respect to the direct-current component, and hence only Fx_max×Fy_max pieces are present as significant information.

A result of calculation in Fourier transform is output in a complex number form including a real part and an imaginary part. Typically, Fourier transform is carried out in accordance with an equation (1):

$$F(u, v) = \sum_{x,y} f(x, y) W_{N1}^{ux} W_{N2}^{vy} \quad (1)$$

$$W_N = e^{-j\frac{2\pi}{N}}$$

where N1, N2 each represent a window size.

Namely, frequency information is output in the complex number form including a real part Re(u, v) and an imaginary part Im(u, v). Values for the real part and the imaginary part can be used for conversion to amplitude information A(u, v) and phase information θ(u, v).

A relational expression between amplitude information and phase information, and the complex expression including the real part and the imaginary part is as shown in an equation (2).

$$A(u, v) = \sqrt{\text{Re}(u, v)^2 + \text{Im}(u, v)^2} \quad (2)$$

$$\theta(u, v) = \tan^{-1}\left(\frac{\text{Im}(u, v)}{\text{Re}(u, v)}\right)$$

A result of Fourier transform may be saved in a form of combination of amplitude and phase or saved in a form of combination of the real part and the imaginary part.

In Fourier transform described above, data of one window size N×M can be used to calculate all frequency components. In the present embodiment, however, data of window sizes different depending on frequencies is used for Fourier transform, with frequency components calculated for each window size being limited, which will be described later in the description of frequency operation control unit 15.

Phase extraction portions 145 and 146 use a result of Fourier transform (typically, a complex form) output from Fourier transform portions 143 and 144 to thereby extract phase information on the base window and the reference window, respectively.

Phase difference calculation portion 147 calculates a difference in phase information on windows extracted by phase extraction portions 145 and 146. Namely, phase difference calculation portion 147 generates phase difference information.

Inverse Fourier transform portion 148 calculates a POC value indicating similarity between partial images included in respective set windows by subjecting phase difference information calculated by phase difference calculation portion 147 to inverse Fourier transform. This processing for calculating the POC value is repeatedly performed each time a position of a reference window set on a reference image by reference window setting portion 142 is updated. For a detailed procedure involved with calculation of a POC value, reference is to be made to Document 2 ("A Sub-Pixel Correspondence Search Technique for Computer Vision Applications," IEICE Transactions. Fundamentals, E87-A, No. 8, pp. 1913-1923, August 2004).

Figure 7:
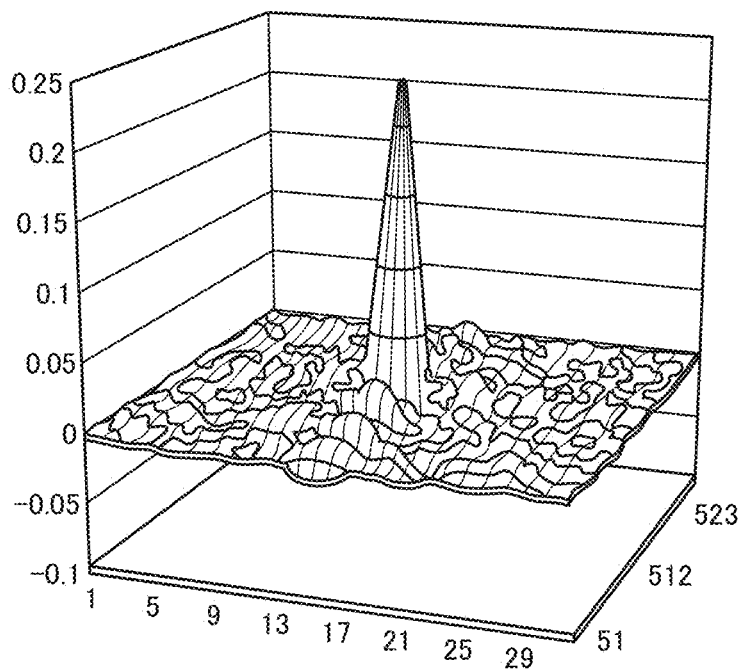
FIG. 7 is a diagram showing one example of a POC value calculated by the corresponding points search portion according to the embodiment of the present invention.

FIG. 7 is a diagram showing one example of a POC value calculated by corresponding points search portion 14 according to the embodiment of the present invention. As shown in FIG. 7, a plurality of POC values associated with set positions of a reference window are calculated.

Maximum value selection portion 149 determines a corresponding point on the reference image by selecting POC taking a maximum value from a map of POC values associated with set positions (candidate points S') in the reference window as shown in FIG. 7.

<<c3: Frequency Operation Control Unit 15>>

In the present embodiment, an amount of information used for calculation for each frequency component is changed in frequency operation such as Fourier transform. Though one-dimensional Fourier transform is employed in the present embodiment, two-dimensional Fourier transform may be employed.

One-dimensional Fourier transform can be expressed as in an equation (3):

$$F(u) = \sum_x f(x, y) W_N^{ux} \quad (3)$$

$$W_N = e^{-j\frac{2\pi}{N}}$$

where N represents a window size.

In a case that a window size is N×1, frequencies of which frequency components can be calculated with Fourier transform are 1 to Fmax=(N−1)/2. In general Fourier transform, whichever frequency component may be calculated, an equal window size N×1 has been used. In the present embodiment, however, as a frequency to be operated is higher, a window size to be used for frequency operation is made smaller, such that Fourier transform as being limited to a frequency to be operated is carried out.

An operation time period N2 is required for Fourier transform in which a window size is set to N×1 and frequency components of all frequencies are obtained, however, an operation time period is actually N2/2 because a result in point symmetry with respect to a direct-current component can be obtained. On the other hand, a window size to be used for operation for each frequency F (=u) is set to (N+1)−F (where N represents a maximum value of a window size) for limitation of a frequency to be operated. Then, a total amount of operation is as shown in an expression (4).

$$F\max \times (2 \times N + 1 - F\max)/2 = 3(N^2-1)/8 \quad (4)$$

Namely, when N is great to some extent, a constant term in the equation (4) above can be ignored, and therefore the overall operation time period can be reduced to approximately 75% with respect to a normal operation time period N2/2.

(c3.1: First Setting Example)

In the example described above, a case that a window size to be used for operation for each frequency F is set to (N+1)−F, that is, a case that a window size is different for each frequency F, has been described, however, a setting method other than this may be adopted. For example, as in N−P×[F/P] (where N represents a maximum value of a window size, P represents an integer not smaller than 2, and [•] represents a Gaussian sign), a window size may discretely be set in accordance with frequency F. Namely, frequency operation control unit 15 discretely changes a window size in accordance with a frequency used for calculation of frequency decomposition.

Specifically, for example, relation between frequency F and a window size in a case of N=33 and P=2 is as follows. In this case, for a plurality of frequencies F the same in a window size, a frequency component should only be operated in single Fourier transform. Namely, frequency operation control unit 15 changes a window size for each frequency to be used for calculation of frequency decomposition.

Frequency F=1→window size 33
Frequency F=2→window size 31
Frequency F=3→window size 31
Frequency F=4→window size 29
Frequency F=5→window size 29
Frequency F=6→window size 27
Frequency F=7→window size 27
Frequency F=8→window size 25
Frequency F=9→window size 25
Frequency F=10→window size 23
Frequency F=11→window size 23
Frequency F=12→window size 21
Frequency F=13→window size 21
Frequency F=14→window size 19
Frequency F=15→window size 19
Frequency F=16→window size 17

(c3.2: Second Setting Example)

Though the method of setting a window size described above is a method of setting a window size at equal intervals, a method of setting a window size may be changed between a lower frequency side and a higher frequency side. For example, for frequency F satisfying 1≤F<Q (Q<N/2), a window size may be determined as N−P1×[F/P1], and for frequency F satisfying Q≤F, a window size may be determined as N−P2×[F/P2] (P1≠P2). Specifically, for example, relation between frequency F and a window size in a case of N=33, P1=2, P2=4, and Q=8 is as follows.

Frequency F=1→window size 33
Frequency F=2→window size 31
Frequency F=3→window size 31
Frequency F=4→window size 29
Frequency F=5→window size 29
Frequency F=6→window size 27
Frequency F=7→window size 27
Frequency F=8→window size 25
Frequency F=9→window size 25
Frequency F=10→window size 25
Frequency F=11→window size 25
Frequency F=12→window size 21
Frequency F=13→window size 21
Frequency F=14→window size 21
Frequency F=15→window size 21
Frequency F=16→window size 17

Though a setting example in which frequency F is divided into two, that is, a frequency equal to or higher than Q and a frequency lower than Q, has been shown in the example described above, the frequency may be divided into three or more.

[D. Processing Procedure]

An overall procedure in a method for searching for corresponding points according to the present embodiment will now be described.

Figure 8:
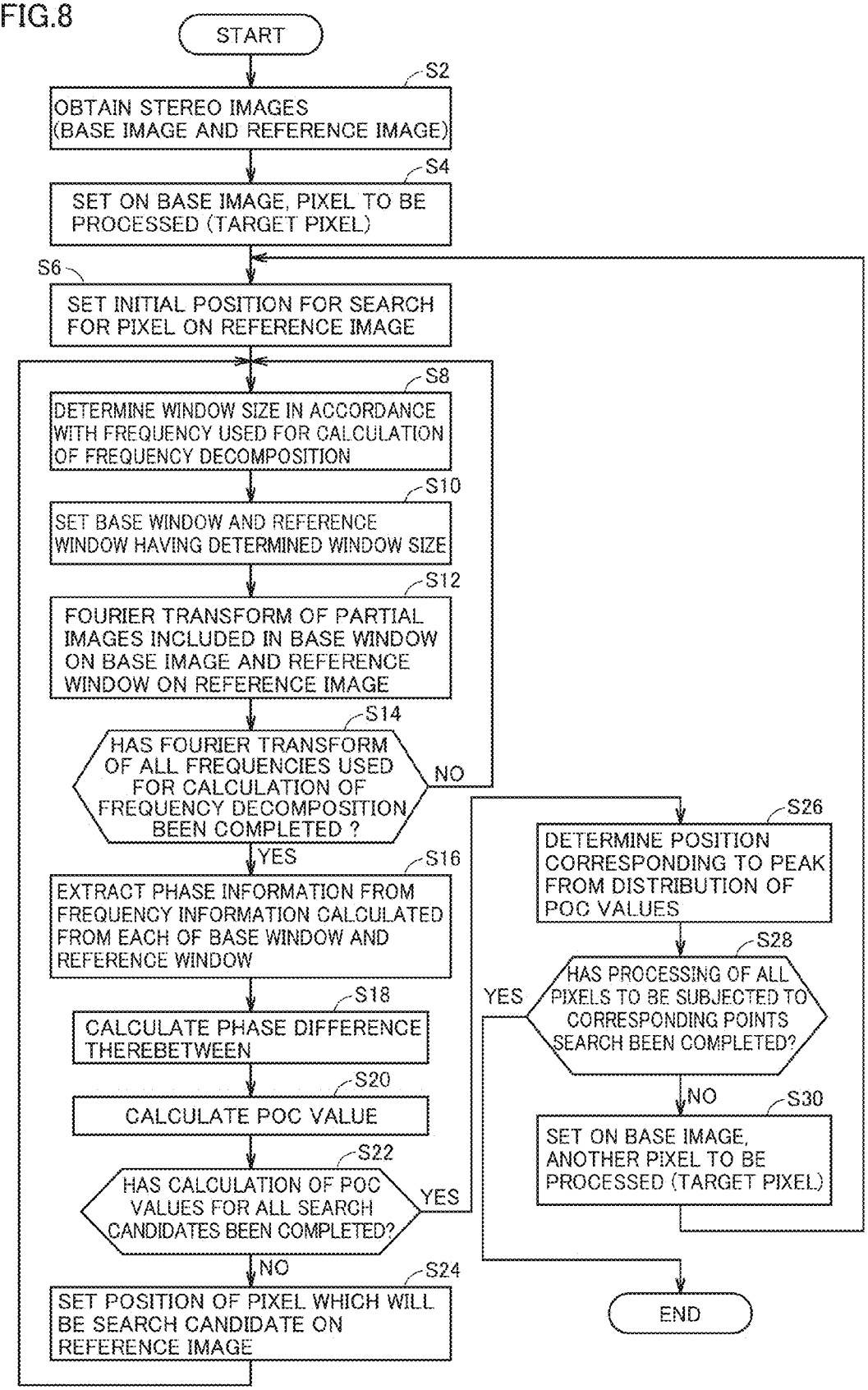
FIG. 8 is a flowchart showing an overall procedure in the method for searching for corresponding points according to the embodiment of the present invention.

FIG. 8 is a flowchart showing the overall procedure in the method for searching for corresponding points according to the embodiment of the present invention. Each step shown in FIG. 8 is typically implemented as CPU 102 (FIG. 3) executes corresponding points search processing program 112.

Referring to FIG. 8, initially, CPU 102 obtains stereo images (a base image and a reference image) (step S2). In succession, CPU 102 sets a pixel to be processed (a target pixel) on a base image (step S4) and sets an initial position for search for a pixel on a reference image, which corresponds to the pixel to be processed which was set on the base image (step S6). Then, search processing as shown below is performed.

Namely, CPU 102 determines a window size in accordance with a frequency used for calculation of frequency decomposition (step S8). Then, CPU 102 sets a base window having the determined window size such that the pixel to be processed on the base image is located at a position of center of gravity thereof and sets a reference window having the determined window size such that a pixel which is a search candidate on the reference image is located at a position of center of gravity thereof (step S10).

In succession, CPU 102 subjects partial images included in the base window on the base image and the reference window on the reference image set in step S10 to Fourier transform (step S12). Frequency information calculated in this Fourier transform is stored in association with a frequency to be processed. Then, CPU 102 determines whether or not Fourier transform of all frequencies used for calculation of frequency decomposition has been completed (step S14).

When Fourier transform of all frequencies used for calculation of frequency decomposition has not been completed (NO in step S14), CPU 102 selects a next frequency used for calculation of frequency decomposition and repeatedly performs processing in step S8 and later.

When Fourier transform of all frequencies used for calculation of frequency decomposition has been completed (YES in step S14), CPU 102 extracts only phase information from frequency information calculated from the base window and the reference window (step S16) and calculates a phase difference therebetween (step S18). Namely, in step S16, since Fourier transform of all necessary frequencies has been completed, amplitude and phase for each frequency have been calculated. CPU 102 uses such information to calculate information on frequency-phase difference. CPU 102 calculates a POC value by subjecting calculated phase difference information to inverse Fourier transform (step S20). This POC value is stored in association with a position of a pixel which is the search candidate set in the reference image.

In succession, CPU 102 determines whether or not POC values have been calculated for all search candidates which can be set for the reference image (step S22). When there is a search candidate for which a POC value has not been calculated among all search candidates which can be set for the reference image (NO in step S22), CPU 102 sets a position of a pixel which will be a search candidate on the reference image (step S24) and repeatedly performs processing in step S8 and later.

When POC values for all search candidates which can be set for the reference image have been calculated (YES in step S22), CPU 102 determines a position corresponding to the peak from distribution of POC values (step S26). Namely, CPU 102 extracts a position indicating the highest POC value among the search candidates included in the reference image, and determines the extracted position as the corresponding point of the pixel (target pixel) set on the base image.

Thereafter, CPU 102 determines whether or not processing for all pixels to be subjected to corresponding points search on the base image has been completed (step S28). When there is a pixel for which processing has not been completed among pixels to be subjected to corresponding points search on the base image (NO in step S28), CPU 102 sets on the base image, another pixel (target pixel) to be processed (step S30), and repeatedly performs processing in step S6 and later.

When processing for all pixels to be subjected to corresponding points search on the base image has been completed (YES in step S28), the process ends.

[E. First Variation: Change in Window Size in Line with Power of 2]

In carrying out Fourier transform with the use of a computer, fast Fourier transform (FFT) characterized by butterfly computation is used so that an operation time period can be shortened.

In this case, a size of a window to be set should satisfy a condition of a power of 2. Namely, from a point of view of an operation speed, a size of a window is preferably set to a power of 2. In the present variation, an example in which a size of a window is changed in line with a power of 2 in accordance with a frequency used for calculation of frequency decomposition will be described.

For example, in a case that a size of a largest window is set to 32×16, a frequency in a lateral direction is expressed by a direct-current component and alternating-current components of frequencies 1 to 15 and a frequency in a vertical direction is expressed by a direct-current component and alternating-current components of frequencies 1 to 7.

In general, it has been known that, in a case that an amount of operation in normal Fourier transform is N2, use of fast Fourier transform (FFT) results in an amount of operation of N×log 2N. For example, in a case that a size of a window is 32×32, an amount of operation is 1024 in normal Fourier transform, whereas an amount of operation is 160 in fast Fourier transform (FFT). Speed-up by 80% or more can thus be realized.

In consideration of the point above, if a size of a window is randomly changed in using fast Fourier transform (FFT) in the embodiment described above, an amount of operation may increase.

Therefore, in using fast Fourier transform (FFT), information of an operation target (a window size) is set to have a size of a power of 2, so that an amount of operation can be decreased. For example, an amount of FFT operation in a case of a window size of 8 is 8×log 28=24. If only frequencies 1 to 4 are calculated, an amount of operation is 12, which is half the above. When information of a window size 4 is calculated for frequencies 5 to 8, an amount of operation is 4×log 24=8, and an amount of operation in total is 12+8=20. Namely, in this case, an effect of reduction in amount of operation by approximately 17% can be obtained.

An example of setting a window size for obtaining such an effect of reduction in amount of operation is as follows.

Frequency F=1, 2, 3, 4→window size 8 (23)
Frequency F=5, 6, 7, 8→window size 4 (22)

[F. Second Variation: Application of Window Function]

Though Fourier transform is carried out based on continuity at opposing ends of a representation included in a window, actually, continuity is not kept. Therefore, as preprocessing before Fourier transform, generally, such signal processing as applying a window function so as to ensure continuity of an image is adopted. Various types such as a hamming window, a Kaiser window, and a hanning window are defined as such a window function, and any window function can be adopted.

For example, a one-dimensional hanning window can be defined as in an equation (5):

$$H(i) = \frac{1 + \cos\left(\frac{\pi}{M}i\right)}{2} \quad (5)$$

where $-M \le i \le M (i \in \text{integer})$.

In the embodiment described above, as compared with a size of a window used for calculation of phase information of a lower spatial frequency, a window used for calculation of phase information of a higher spatial frequency is set to have a narrower range. Here, since continuity at opposing ends of the narrower range is not ensured, accuracy may deteriorate.

Then, by applying a window function in accordance with a size of a window set for each spatial frequency each time, accuracy in frequency operation can be stabilized. Namely, in the present variation, corresponding points search portion 14 performs convolution operation with a window function on a representation included in a window. Here, the window function is set in accordance with a size of the window of interest. In other words, convolution operation with a window function performed before frequency operation is performed in accordance with a set window size.

Though an amount of operation may increase due to convolution operation with a window function for each window size, by properly setting a size, an amount of operation can be reduced while accuracy is kept. For example, in the case of the example described in the first variation described above, a window function should newly be applied to information (window size 4) used for operating frequency information for frequencies 5 to 8. An amount of operation involved with application of the window function at this time is 4/2=2. Though both of a real part and an imaginary part should be operated in Fourier transform, the window function should operate only the real part, which corresponds to an amount of operation approximately half the size in terms of a ratio. Thus, even though the window function is applied for each window size, an effect of reduction in an amount of operation can be exhibited.

Though one-dimensional Fourier transform has been described above, expansion to two-dimensional Fourier transform can be made. For example, a two-dimensional hanning window can be defined as in an equation (6):

$$H(i, j) = \frac{1 + \cos\left(\frac{\pi}{M}i\right)}{2} \times \frac{1 + \cos\left(\frac{\pi}{N}j\right)}{2} \quad (6)$$

where $-M \leq i \leq M,$ $-N \leq j \leq N(i, j \in \text{integer}).$

In applying a window function, the equation (5) should only be applied collectively once, and hence an effect of reduction in an amount of operation can be enhanced as compared with the case of one-dimensional Fourier transform.

[G. Third Variation: Coarse-to-Fine Strategy Using Multi-Resolution]

Processing for searching for corresponding points as combined with a coarse-to-fine strategy using multi-resolution will be described as a third variation of the embodiment of the present invention.

As described above, in the present embodiment, a time period for operation is shortened by restricting a window size used for calculation for each frequency in frequency decomposition, however, reduction in size of a window used for frequency decomposition as such may narrow a range of search. For example, restriction of a window size used for calculation for all frequencies is equivalent to decrease in size of a window, and a range which can be searched for corresponding points may be restricted.

This restriction of a range which can be searched is imposed not on a base window set on a base image but only on a reference window set on a reference image. On the base image side, a base window is set such that a target point to be found is located at a position of center of gravity thereof. Therefore, even when a window size used in calculation is made smaller, a point to be found is contained without fail. On the other hand, in a case of a reference window set on the reference image side, a point to be found is not necessarily located at a position of center of gravity of the reference window. Therefore, if a window size used for calculation is made smaller, the point to be found may not be contained (or may hardly be included at the end of the window size), and consequently a range of search is narrowed.

As above, in the present embodiment, in order to cover a search range, a size of a window is used as it is at a lower frequency (that is, all information is used) for frequency decomposition, whereas a window size used for calculation is restricted only for a higher frequency. A search range which can be covered by a higher frequency, however, is substantially narrow, and hence accuracy may be affected if a wide search range is required.

In the present variation, combination with a coarse-to-fine strategy using multi-resolution (a multi-resolution strategy) can exhibit a high effect of decrease in time period for operation while accuracy in corresponding points search is maintained. In other words, by making use of the multi-resolution strategy, a search range can be limited to some extent. Therefore, even when a window size used for calculation is restricted for a higher frequency, influence on accuracy can be suppressed. Namely, frequency operation control unit 15 changes a window size finely on a lower frequency side and changes a window size coarsely on a higher frequency side, with a frequency used for calculation of frequency decomposition being divided into the lower frequency side and the higher frequency side.

The coarse-to-fine strategy using multi-resolution (the multi-resolution strategy) converts input images (a base image and a reference image) into a group of images having a plurality of resolutions and uses a result of search for corresponding points in images different in resolution, to thereby determine corresponding points between the input images (the base image and the reference image). More specifically, initially, corresponding points between images lower in resolution are searched for. Though a time period for operation in corresponding points search processing can be short because of lower resolution, accuracy of a found position is relatively low (accuracy of corresponding resolution is the limit). In succession, corresponding points between images higherer in resolution are searched for. Here, the result of search for corresponding points performed earlier is made use of for search of the limited range. Therefore, even when resolution is higher, a time period for operation can be shortened. By subsequently performing similar processing, corresponding points found in the images highest in resolution are output as the result of search for corresponding points.

Figure 9:
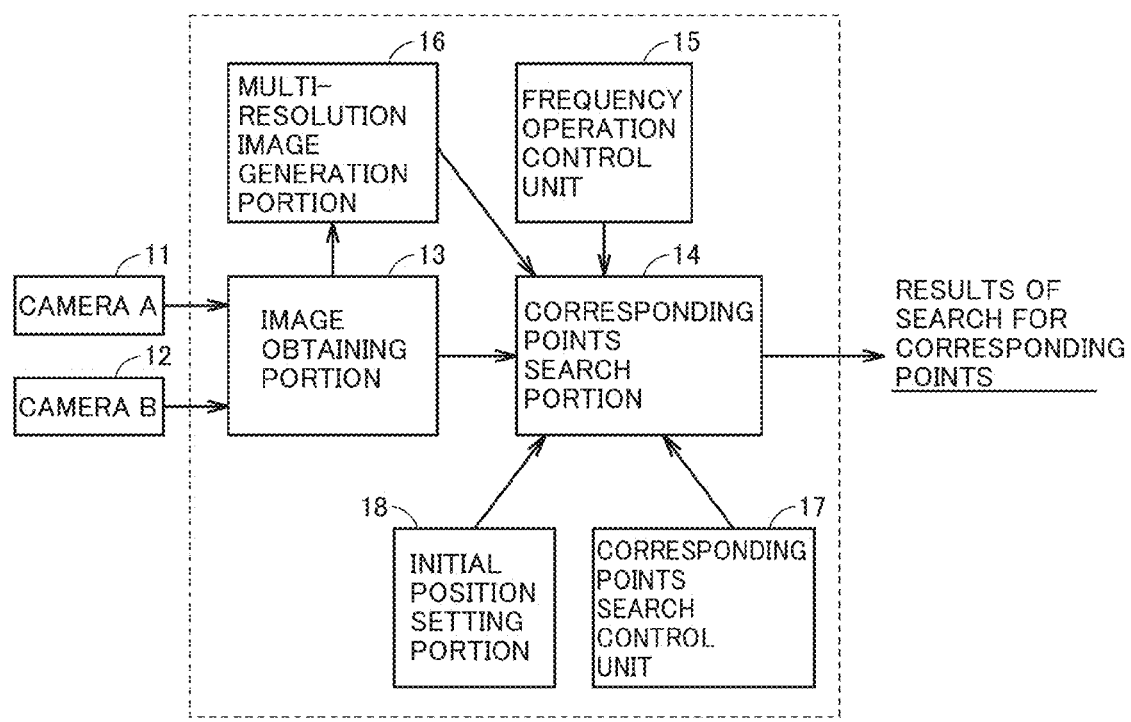
FIG. 9 is a block diagram showing a functional configuration of an image processing apparatus according to a second variation of the embodiment of the present invention.

FIG. 9 is a block diagram showing a functional configuration of an image processing apparatus according to the second variation of the embodiment of the present invention. Elements in the block diagram shown in FIG. 9 which are the same as those in the block diagram shown in FIG. 5 have the same reference characters allotted. Namely, the image processing apparatus according to the present variation additionally includes a multi-resolution image generation portion 16, a corresponding points search control unit 17, and an initial position setting portion 18, as compared with the image processing apparatus according to the present embodiment shown in FIG. 5. Since other elements have been described above, detailed description will not be repeated.

<<g1: Multi-Resolution Image Generation Portion 16>>

Figure 10:
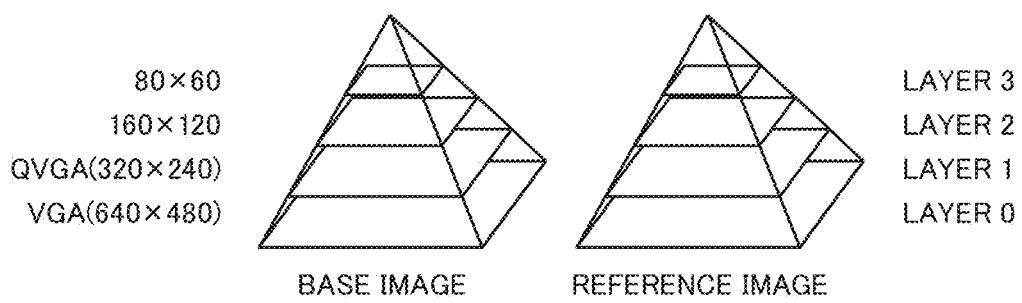
FIG. 10 is a schematic diagram showing a group of images different in resolution which are generated in the second variation of the embodiment of the present invention.
Figure 11:
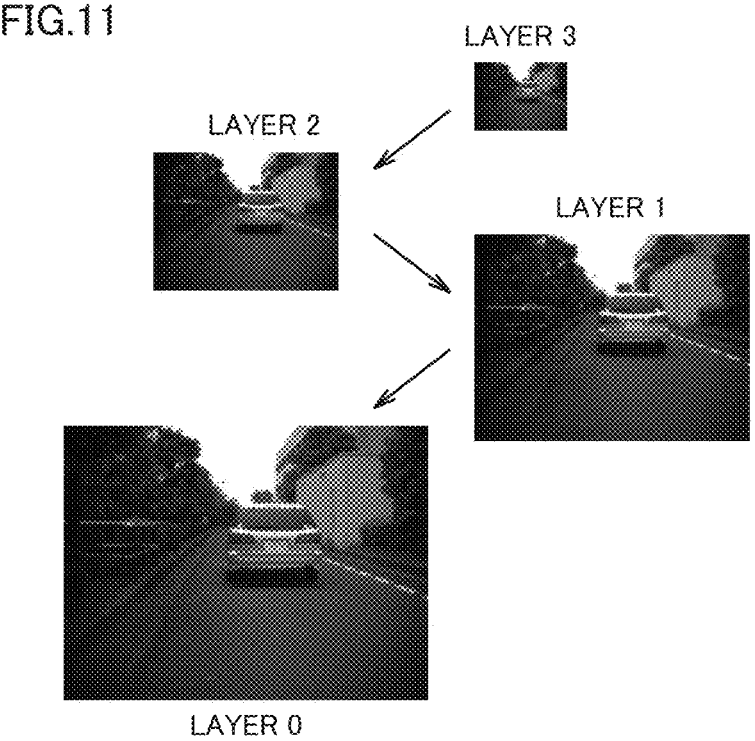
FIG. 11 is a diagram showing one example of the group of images different in resolution which are generated in the second variation of the embodiment of the present invention.

FIG. 10 is a schematic diagram showing a group of images different in resolution which are generated in the second variation of the embodiment of the present invention. FIG. 11 is a diagram showing one example of the group of images different in resolution which are generated in the second variation of the embodiment of the present invention.

Multi-resolution image generation portion 16 generates a plurality of images different in resolution as shown in FIGS. 10 and 11 from input stereo images (a base image and a reference image).

In a case that resolution of the input image is VGA (640×480), a conversion factor is set to ½, and the number of layers is set to 4, multi-resolution image generation portion 16 generates, for example, a group of images of "VGA (640×480)," "QVGA (320×240)," "160×120", and "80×60" for each of the base image and the reference image. VGA, QVGA, 160×120, and 80×60 representing input layers are also denoted as a layer 0, a layer 1, a layer 2, and a layer 3, respectively.

In such a group of images different in resolution, in accordance with a conversion factor, relation as below is satisfied. Namely, a pixel value at a coordinate (x, y) in layer 3 is calculated as an average value of 2×2 pixels consisting of a coordinate (2x, 2y), a coordinate (2x+1, 2y), a coordinate (2x, 2y+1), and a coordinate (2x+1, 2y+1).

A conversion factor is not limited to ½, and a smaller value such as ⅓ may be adopted. In this case, the number of necessary layers can be small, which is useful for a case where faster processing is required. Alternatively, a larger value such as 1/1.5 may be adopted as a conversion factor. By doing so, the number of necessary layers increases and operation load is relatively high, however, search is finer and hence robustness can be enhanced.

A conversion factor does not have to be the same among layers, and for example, a smaller conversion factor may be adopted in a portion close to an input image, and a conversion factor may be greater as resolution is lower. By varying such a conversion factor, in a case of lower resolution where mixing due to a distance is significant, finer search can be conducted to ensure robustness. In a case of higher resolution, importance is placed on a faster speed rather than on robustness, so that corresponding points search processing well balanced in total can be performed.

<<g2: Corresponding Points Search Control Unit 17>>

Corresponding points search control unit 17 performs processing for search for corresponding points between input images (a base image and a reference image) in accordance with a procedure as described below. Here, as described above, a case that resolution of the input images is VGA (640×480), a conversion factor is set to ½, and the number of layers is set to 4 is described.

Figure 12:
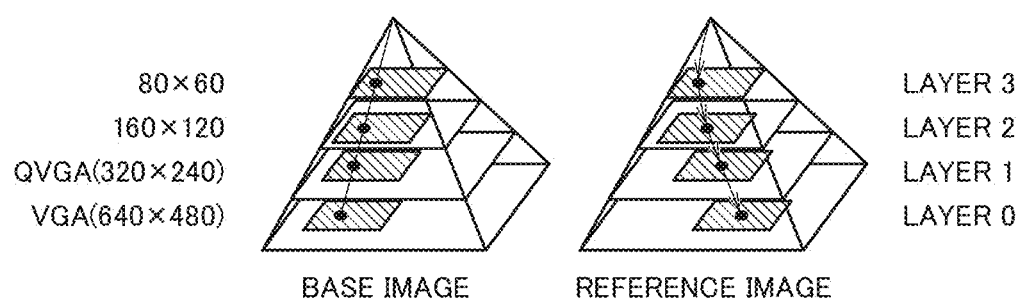
FIG. 12 is a diagram for illustrating processing contents in a coarse-to-fine strategy with the use of multi-resolution according to the second variation of the embodiment of the present invention.

FIG. 12 is a diagram for illustrating processing contents in a coarse-to-fine strategy with the use of multi-resolution according to the second variation of the embodiment of the present invention.

Referring to FIG. 12, for example, it is assumed that, in layer 3, a pixel at a coordinate (p3, q3) on a reference image corresponding to a pixel at a coordinate (x3, y3) on a base image is calculated through corresponding points search. Then, when a pixel on the reference image corresponding to a pixel at a coordinate (x2, y2) on the base image is searched for in layer 2, a result in search for corresponding points in layer 3 is made use of. Specifically, since a position of a correct answer is present in the vicinity of a coordinate (p, q) on the reference image found in layer 3, in layer 2, it is considered to be present in the vicinity of a coordinate approximately twice the coordinate (p, q) on the reference image in layer 3. Therefore, an approximate position of the correct answer on the reference image in layer 1 is then found by using a result of search for corresponding points in layer 2. A result of lower resolution is thus gradually brought closer to the correct answer to an initial position of higher resolution. Such a search scheme is generally referred to as a multi-resolution strategy or a coarse-to-fine strategy.

<<g3: Initial Position Setting Portion 18>>

Initial position setting portion 18 sets an initial position at the time of change in layer in the multi-resolution strategy (the coarse-to-fine strategy) described above.

Figure 13:
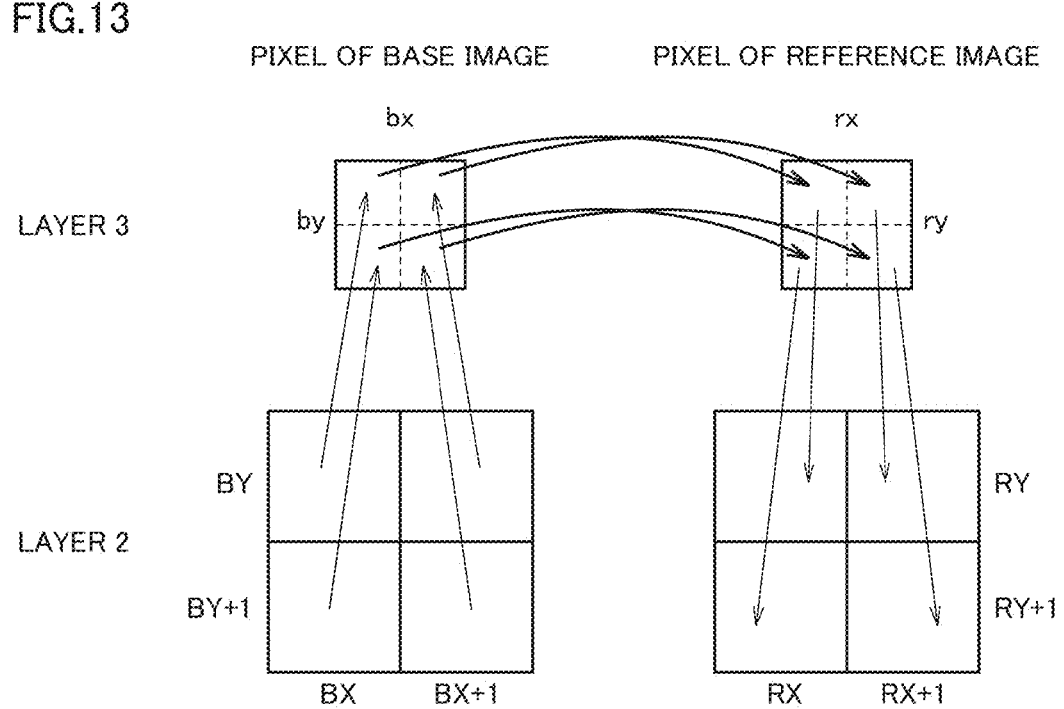
FIG. 13 is a diagram for illustrating processing for setting an initial position in the coarse-to-fine strategy with the use of multi-resolution according to the second variation of the embodiment of the present invention.

FIG. 13 is a diagram for illustrating processing for setting an initial position in the coarse-to-fine strategy with the use of multi-resolution according to the second variation of the embodiment of the present invention. More specifically, FIG. 13 is a diagram which is extraction of a part of layer 2 and layer 3 of the base image and the reference image.

For example, a pixel at a coordinate (bx, by) on the base image in layer 3 is calculated as an average value of 2×2 of a coordinate (BX, BY), a coordinate (BX+1, BY), a coordinate (BX, BY+1), and a coordinate (BX+1, BY+1) on the base image in layer 2. It is assumed that, in layer 3, a pixel at the coordinate (bx, by) on the base image has been brought in correspondence with a pixel at a coordinate (rx, ry) on the reference image. Initial position setting portion 18 sets an initial position for the corresponding points search in layer 2 on the reference image side based on the result in search for corresponding points in layer 3. This setting method is performed as below.

By thus setting the initial position, accuracy in setting can be higher. For simplification of operation, uniformly the same initial position (2×rx, 2×ry) may be provided to (RX, RY), (RX+1, RY), (RX, RY+1), and (RX+1, RY+1).

<<g4: Summary>>

According to the present variation, a time period for operation can be shortened without restriction of a search range in the corresponding points search.

[H. First Application]

The image processing apparatus according to the present embodiment and the variation thereof described above can be applied, for example, to stereo measurement. More specifically, an image of an object is picked up with a stereo camera, and a distance to the object is measured based on a result of correspondence between images obtained by image pick-up.

Figure 14:
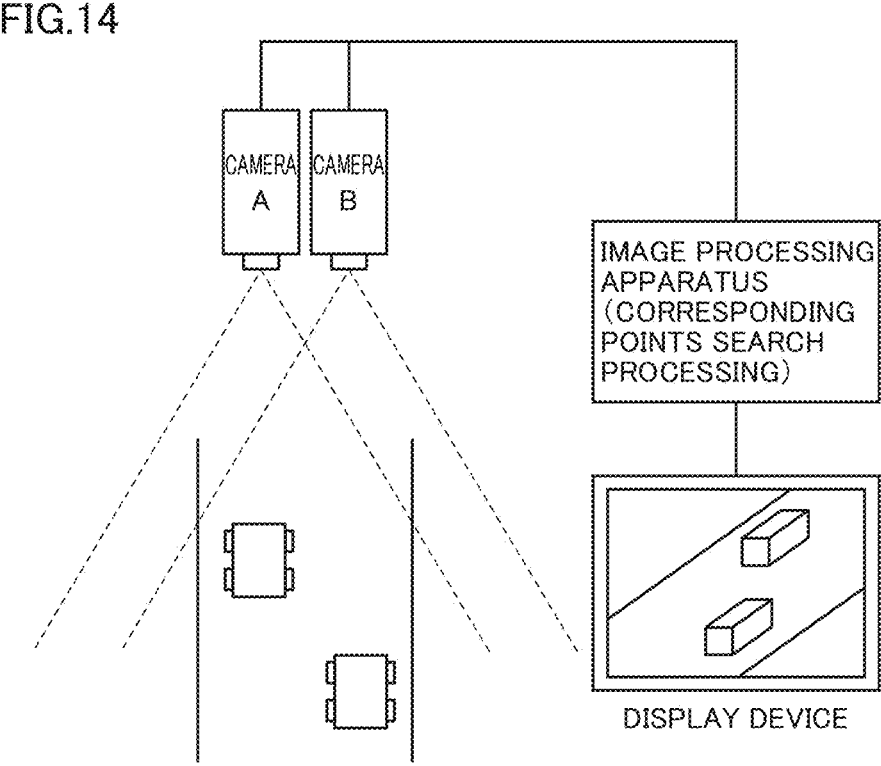
FIG. 14 is a diagram for illustrating a first application of the image processing apparatus according to the embodiment of the present invention.
Figure 15:
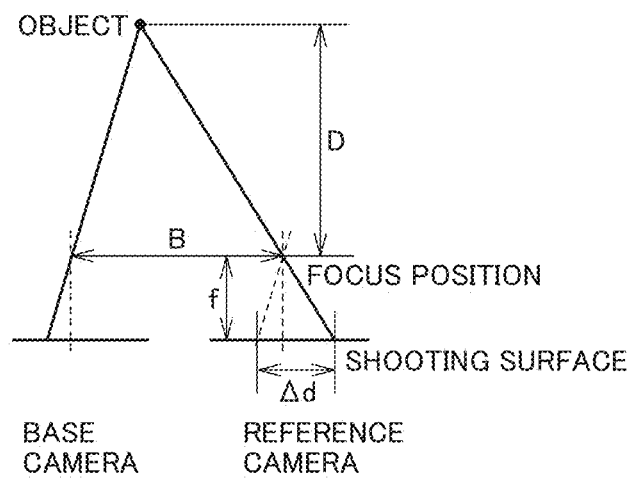
FIG. 15 is a diagram for illustrating principles in stereo measurement shown in FIG. 14.

FIG. 14 is a diagram for illustrating a first application of the image processing apparatus according to the embodiment of the present invention. FIG. 15 is a diagram for illustrating principles in stereo measurement shown in FIG. 14.

Referring to FIG. 14, in stereo measurement, two cameras (stereo cameras) simultaneously pick up an image of an object. The image processing apparatus performs processing for search for corresponding points between two input images (a base image and a reference image) obtained by image pick-up and brings the images in correspondence with each other. The image processing apparatus obtains from the result of correspondence, information on a distance to the object based on triangulation principles.

As shown in FIG. 15, when a difference in position of the corresponding points (a parallax) between a base camera generating a base image and a reference camera generating a reference image is $\Delta d$, a distance D to the object is calculated in an equation below:

$$D = fB/\Delta d$$

where B represents a baseline length of the camera and f represents a focal length of a camera lens.

A three-dimensional position (X, Y, Z) of the object is calculated in an equation below:

$$X = x \times D / f$$

$$Y = y \times D / f$$

$$Z = D$$

where x, y is a coordinate of a target pixel on the base image.

[I. Second Application]

Though an example in which images temporally simultaneously picked up are brought in correspondence has been described in the first application above, images picked up at different timing may be brought in correspondence.

Figure 16:
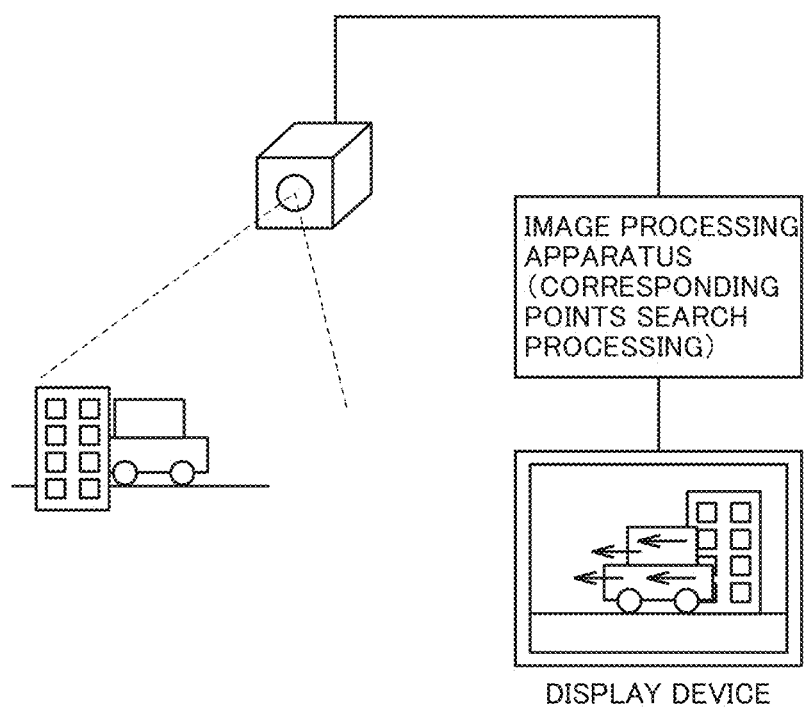
FIG. 16 is a diagram for illustrating a second application of the image processing apparatus according to the embodiment of the present invention.

FIG. 16 is a diagram for illustrating a second application of the image processing apparatus according to the embodiment of the present invention. As shown in FIG. 16, one camera picks up images over time, and the image processing apparatus performs processing for search for corresponding points between two temporally different images. With the use of a result of this correspondence, information on movement over time of an object (movement information) is calculated and displayed. For example, in which direction and at which speed an object moves is visually expressed as shown in FIG. 16.

[J. Advantages]

According to the present embodiment, a window size used for calculation for each frequency in frequency decomposition is restricted, so that a time period for operation can be shortened. Namely, information used for frequency decomposition is decreased for a higher frequency so that an overall amount of processing can be decreased. In particular, since frequency decomposition used in corresponding points search processing is high in operation load, operation load can more efficiently be decreased by adopting the method according to the present embodiment.

[K. Another Form]

An embodiment of the present invention includes a manner as below.

A corresponding points search method according to one aspect of the present invention includes an image obtaining step of obtaining two or more substantially the same images, a step of setting a window for each of the two or more images obtained in the image obtaining step, a step of extracting phase information by subjecting each set window to frequency decomposition, a step of determining a point in a second image which corresponds to a point in a first image of the two or more images obtained in the image obtaining step by calculating a difference in extracted phase information, and a step of calculating each frequency by setting a predetermined window size used for calculation for each frequency in frequency decomposition.

Preferably, at least a window size used for a higher frequency is set to be equal to or smaller than that for a lower frequency.

Preferably, a window size used for calculation for each frequency is made smaller so as to be a power of 2.

Preferably, convolution operation with a window function performed before frequency operation is performed in accordance with a set window size.

Preferably, the method further includes the steps of converting an obtained stereo image to a plurality of resolutions and conducting corresponding points search with the use of phase-only correlation at each resolution based on a coarse-to-fine strategy.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 11, 12 camera; 13 image obtaining portion; 14 corresponding points search portion; 15 frequency operation control unit; 16 multi-resolution image obtaining portion; 17 corresponding points search control unit; 18 initial position setting portion; 100, 200 image processing apparatus; 102 CPU; 104 RAM; 106 ROM; 108 network interface; 110 auxiliary storage device; 112 corresponding points search processing program; 114 image to be processed; 120, 206 display portion; 122, 204 input portion; 124 memory card interface; 126 memory card; 130 bus; 141 base window setting portion; 142 reference window setting portion; 143, 144 Fourier transform portion; 145, 146 phase extraction portion; 147 phase difference calculation portion; 148 inverse Fourier transform portion; 149 maximum value selection portion; 202 image processing engine; 212, 222 lens; and 214, 224 image sensor.

The invention claimed is:

1. An image processing apparatus for searching for corresponding points between a first image and a second image, comprising:
a window setting portion configured to set a window for each of the first image and the second image;
a phase information extraction portion configured to extract phase information by subjecting a representation included in each set window to frequency decomposition;
a corresponding points determination portion configured to determine corresponding points between the first image and the second image based on comparison of the phase information extracted from each set window; and
a window size control portion configured to cause the window setting portion to set windows different in size in accordance with a frequency used for calculation of the frequency decomposition, the window size control portion causing the window setting portion to set a window of a first size in response to a first frequency and to set a window of a second size smaller than the first size in response to a second frequency higher than the first frequency, wherein the window size control portion changes a size of the window in line with a power of 2, in accordance with a frequency used for calculation of the frequency decomposition.

2. An image processing apparatus for searching for corresponding points between a first image and a second image, comprising:
a window setting portion configured to set a window for each of the first image and the second image;
a phase information extraction portion configured to extract phase information by subjecting a representation included in each set window to frequency decomposition;
a corresponding points determination portion configured to determine corresponding points between the first image and the second image based on comparison of the phase information extracted from each set window; and a window size control portion configured to cause the window setting portion to set windows different in size in accordance with a frequency used for calculation of the frequency decomposition, the window size control portion causing the window setting portion to set a window of a first size in response to a first frequency and to set a window of a second size smaller than the first size in response to a second frequency higher than the first frequency, wherein for each set window, the window size control portion changes a size of the set window finely on a lower frequency side and changes a size of the set window coarsely on a higher frequency side, with a frequency used for calculation of the frequency decomposition being divided into the lower frequency side and the higher frequency side.

3. An image processing method for searching for corresponding points between a first image and a second image, comprising:
  setting a window for each of the first image and the second image;
  extracting phase information by subjecting a representation included in each set window to a frequency decomposition; and
  determining a corresponding points between the first image and the second image based on comparison of the phase information extracted from each set window, in the setting a window size, a window of a first size being set in response to a first frequency used for calculation of the frequency decomposition and a window of a second size smaller than the first size being set in response to a second frequency higher than the first frequency wherein a size of the window is changed in line with a power of 2, in accordance with a frequency used for calculation of the frequency decomposition.

4. An image processing method for searching for corresponding points between a first image and a second image, comprising:
  setting a window for each of the first image and the second image;
  extracting phase information by subjecting a representation included in each set window to a frequency decomposition; and
  determining a corresponding points between the first image and the second image based on comparison of the phase information extracted from each set window, in the setting a window size, a window of a first size being set in response to a first frequency used for calculation of the frequency decomposition and a window of a second size smaller than the first size being set in response to a second frequency higher than the first frequency, wherein for each set window, a size of the set window is finely changed on a lower frequency side and a size of the set window is coarsely changed on a higher frequency side, with a frequency used for calculation of the frequency decomposition being divided into the lower frequency side and the higher frequency side.

5. A non-transitory storage medium stored thereon an image processing program for searching for corresponding points between a first image and a second image, when executed by a computer, the image processing program causing the computer to perform:
  setting a window for each of the first image and the second image;
  extracting phase information by subjecting a representation included in each set window to frequency decomposition; and
  determining corresponding points between the first image and the second image based on comparison of the phase information extracted from each set window, in the setting a window size, a window of a first size being set in response to a first frequency used for calculation of the frequency decomposition and a window of a second size smaller than the first size being set in response to a second frequency higher than the first frequency, wherein a size of the window is changed in line with a power of 2, in accordance with a frequency used for calculation of the frequency decomposition.

6. A non-transitory storage medium stored thereon an image processing program for searching for corresponding points between a first image and a second image, when executed by a computer, the image processing program causing the computer to perform:
  setting a window for each of the first image and the second image;
  extracting phase information by subjecting a representation included in each set window to frequency decomposition; and
  determining corresponding points between the first image and the second image based on comparison of the phase information extracted from each set window, in the setting a window size, a window of a first size being set in response to a first frequency used for calculation of the frequency decomposition and a window of a second size smaller than the first size being set in response to a second frequency higher than the first frequency, wherein for each set window, a size of the set window is finely changed on a lower frequency side and a size of the set window is coarsely changed on a higher frequency side, with a frequency used for calculation of the frequency decomposition being divided into the lower frequency side and the higher frequency side.

* * * * *